(12) United States Patent
Choong et al.

(10) Patent No.: US 9,195,815 B2
(45) Date of Patent: Nov. 24, 2015

(54) SYSTEMS AND METHODS FOR AUTOMATED SELECTION OF A RESTRICTED COMPUTING ENVIRONMENT BASED ON DETECTED FACIAL AGE AND/OR GENDER

(75) Inventors: Bing Mei Choong, Singapore (SG); Ser Mui Koh, Singapore (SG)

(73) Assignee: Dell Products L.P., Round Rock, TX (US)

( * ) Notice: Subject to any disclaimer, the term of this patent is extended or adjusted under 35 U.S.C. 154(b) by 399 days.

(21) Appl. No.: 13/163,050

(22) Filed: Jun. 17, 2011

(65) Prior Publication Data

US 2012/0321144 A1 Dec. 20, 2012

(51) Int. Cl.
*G06K 9/00* (2006.01)
*G06F 21/32* (2013.01)

(52) U.S. Cl.
CPC ............ *G06F 21/32* (2013.01); *G06K 9/00221* (2013.01); *G06F 2221/2149* (2013.01)

(58) Field of Classification Search
CPC ............ H04N 21/4542; H04N 21/454; H04N 21/4751; G06K 2009/00322; G06K 9/00221; G06K 9/00268; G07C 9/00079; G06F 2221/2149; G06F 21/32
USPC .......................................................... 382/118
See application file for complete search history.

(56) References Cited

U.S. PATENT DOCUMENTS

| 7,636,456 | B2 * | 12/2009 | Collins et al. ................. 382/118 |
| 2004/0088553 | A1 * | 5/2004 | Levin et al. .................... 713/186 |
| 2006/0184800 | A1 * | 8/2006 | Rosenberg ..................... 713/186 |
| 2006/0212479 | A1 | 9/2006 | Habas et al. |
| 2006/0288234 | A1 | 12/2006 | Azar et al. |
| 2007/0256093 | A1 * | 11/2007 | Hiler .............................. 725/28 |
| 2008/0109397 | A1 * | 5/2008 | Sharma et al. .................. 707/1 |
| 2009/0133051 | A1 | 5/2009 | Hildreth |
| 2009/0300671 | A1 * | 12/2009 | Scott et al. ...................... 725/27 |
| 2010/0153697 | A1 | 6/2010 | Ford et al. |

OTHER PUBLICATIONS

Dell, A Closer Look At Dell's Touch-Based Stage UI (Video), Printed from Internet Mar. 9, 2011, 10 pgs.
"Gender Recognition System for Targeted Web Advertizing", Printed from Internet Mar. 10, 2011, 7 pgs.
"PFU Systems Prototype Dual Display Kiosk", Printed from Internet Mar. 10, 2011, 3 pgs.
Age Recognition Software Has a Human Eye, News in Science (ABC Science), Printed from Internet Mar. 10, 2011, 3 pgs.
"Advanced Source Code.Com-Gender Recognition System", Printed from Internet Mar. 10, 2011, 6 pgs.
Wikipedia, "Facial Recognition System", Printed from Internet Mar. 10, 2011, 11 pgs.
Dell, "Dell News From CES: Streak 7 Tablet, Venue Smartphone, Enhanced Dell Stage and More", Printed from Internet Mar. 9, 2011, 8 pgs.
"KidZui", The Internet for Kids, Printed from Internet Mar. 9, 2011, 4 pgs.

(Continued)

*Primary Examiner* — Kim Vu
*Assistant Examiner* — Michael Vanchy, Jr.
(74) *Attorney, Agent, or Firm* — Egan, Peterman & Enders LLP.

(57) ABSTRACT

Systems and methods to select and launch a restricted computing environment on an information handing system in an automated manner based on detected facial age and/or gender of a current user of the information handling system.

28 Claims, 4 Drawing Sheets

(56) References Cited

OTHER PUBLICATIONS

Ward, "Face Detection Software With Gender and Age Recognition—The Future of Interactive Advertising?", dated Aug. 19, 2009, Printed from Internet Jun. 15, 2011, 2 pgs.

The Download Blog, "Log in With Your Face", Printed from Internet Apr. 25, 2011, 5 pgs.

The Download Blog, "Blink to Log in With Your Face", Printed from Internet Apr. 25, 2011, 4 pgs.

Blink Logs in to Windows With Sunglasses-Proof Facial Recognition, Printed from Internet Apr. 25, 2011, 1 pg.

* cited by examiner

SYSTEMS AND METHODS FOR AUTOMATED SELECTION OF A RESTRICTED COMPUTING ENVIRONMENT BASED ON DETECTED FACIAL AGE AND/OR GENDER

FIELD OF THE INVENTION

This invention relates generally to information handling systems, and more particularly to selection of a restricted computing environment for information handling systems based on facial age and/or gender detection.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Kids computer browsers are available that provide features such as parental control, safe Internet surfing (using an "Include List" approach), limited access to computer resources, and children friendly and educational contents. To utilize such browsers, parents filter the age appropriate materials and create and customize a parental windows account, while younger children (e.g., ages 3-6) typically require parental intervention to launch the kids browsers for them. Sometimes it is possible to use shortcut keys to escape from the kids browser environment. For senior citizens, a "Go Computer" dedicated hardware solution has been developed for senior citizens that provide a simple web browsing and email experience.

Facial recognition technologies exist that detect a person's age or gender for purposes of presenting targeting advertising to the person, e.g., in a standalone kiosk environment such as for vending machines and camera surveillance kiosk applications. Facial recognition has also been implemented to switch to a particular Windows user account based on identification of the current computer user.

SUMMARY OF THE INVENTION

Disclosed herein are systems and methods that may be employed to select, launch and provide access for a user to a restricted computing environment that limits the interactive functionality of an information handing system presented to the user based on detected facial age and/or gender of a current user of the information handling system (e.g., in a way that limits at least one or both of the input and output functionality options that are accessible to the user of the information handling system). Interactive to such a restricted computing environment may be implemented by limiting the number of available applications, content items, and/or setting options that are interactively accessible by a particular detected category of current user to a particular designated subset of the total number or set of available applications, content items, and/or setting options that are generally or otherwise available to a user of the information handling system in an unrestricted computing environment. Facial age and/or gender of a current user may be detected based on one or more captured images of the facial characteristics of a current user of the information handling system, e.g., as captured by a webcam, still camera, video camera, or any other suitable image-capturing device coupled to provide digital image data of the user facial characteristics for further processing by the information handling system.

A restricted computing environment may be, for example, a protected or simplified computing environment that only includes a restricted subset of the otherwise available applications (e.g., Internet browsers, computer games, word processing programs, spreadsheet programs, etc.), content items (e.g., graphic images, movies or other video files, etc.), and/or settings options (e.g., font size setting for word processor and other applications, browsing limits and security settings for Internet browser application, etc.) of an information handling system. Such a restricted subset of applications, content items, and/or setting options may be selectively tailored and predefined to fit the needs or abilities of a particular demographic age group of users and/or demographic gender group of users that are anticipated to use the information handling system and, in one embodiment, without any consideration of the particular identity of any given particular user (e.g., without using personal or individual user profiles or accounts set up for different people).

For example, a protected environment allowing access to only a particular subset of limited computer resources (e.g., limited to children-appropriate applications/games, non-violent child appropriate media content items, limited Internet access to child-appropriate websites, no Internet access at all, etc.) may be selected and launched based on a detected age of a current user that is less than a given age threshold, e.g., such as a detected young child user age that is less than 8 years old. As another example, a simplified computer environment having another particular limited subset of available computer resources (e.g., such as a simplified email program application, simplified Internet browser application, etc.) may be selected and launched based on a detected age of a user that is greater than a given age threshold, e.g., such as a detected senior citizen user age that is about 65 years old or greater. Alternatively, a limited set of computer resources for users of a particular gender may be automatically selected and launched in a similar manner based on the detected gender of a current user, e.g., such as computer games, health information, shopping guides, fashion listings or hobbyist websites, etc.

In one exemplary embodiment, the disclosed systems and methods may be implemented to personalize the user environment for each individual computer user of a shared information handling system, e.g., so as to provide a one-stop family desktop sharing experience on a common computer for multiple family members of different ages and genders. For example, the user environment may be personalized for each individual computer user (e.g., based on detected age and/or gender of the user) without creating or using multiple user accounts for the individual users or otherwise requiring entry of credentials or recognition of a particular user identity by entering. Thus, for example, the disclosed systems and methods may be implemented to restrict the user environment to fit the category of each individual computer user without requiring entry or recognition of a password or username for each current user. In this regard, the age and/or gender of a current user may be detected and used to determine a user category and restricted computing environment for a current user that has no predefined user account on the information handling system or has otherwise previously interacted with the system. The disclosed systems and methods may be further implemented in a manner that is applied and integrated with one or more particular software applications, and without requiring dedicated hardware solutions (e.g., such as a dedicated senior citizen computer or a dedicated kids computer) to provide a restricted computing environment for different customer segments.

The disclosed systems and methods may be implemented in one embodiment on an information handling system that employs a generic operating system (such as a Windows desktop) that is built for tech savvy users but that may not be user friendly for younger or older age and less tech savvy users. The disclosed systems and methods may be implemented on such a system without requiring manual customization for appropriate users, which can be tedious and troublesome. Moreover, unlike a prior standalone dedicated system solution which is targeted only for a particular user group such as children or senior citizens, the disclosed systems and methods may be implemented to provide an automated means to launch an appropriate restricted computing environment with corresponding setting options for multiple categories of detected users (e.g., such as a child users, senior citizen users, etc.) in a shared desktop environment that provides access to multiple categories of users on the same information handling system.

Examples of types of restricted computing environments that may be automatically selected based on detected age and/or gender category of a current user include, but are not limited to, a fun, safe and educational "Children's Corner" for the user category of young children users with detected ages of 8 years old or younger, a somewhat less protected "Teen Corner" for category of older children users with detected ages between 8 years and 12 years old, a simplified "Senior Citizen Corner" browsing and computing environment with highly readable displayed text (e.g., with large type font) for category of senior citizen users having detected ages of 65 years old or greater. In one exemplary embodiment, once an information handling system enters a restricted computing environment mode based on detected age and/or gender of the current user, the restricted computing environment may be secured and "locked down" (e.g., limited to the specified limited applications, content items and/or setting options of the given restricted environment) such that the user is unable to exit the current restricted computing environment (e.g., to an unrestricted or less restricted computing environment) unless they are authorized (e.g., with administrator password) to override the current restricted environment.

It will be understood that the particular details of restricted computing environments described above are exemplary and illustrative only. Further, it will be understood that users (e.g., such as an administrator user of a given information handling system) may be enabled to set up and/or specify both the application characteristics of a particular restricted computing environment as well as the particular types of designated environments that may be implemented on a given information handling system. For example, an administrator user may select to implement those restricted computing environments that correspond to the categories of users expected to be encountered by a given information handling system, e.g., both children and senior citizens in a household having grandchildren and grandparents that use the same family computer. Additionally, the administrator user may select the particular applications and Internet browsing limit settings for each of the selected types of protected environments, e.g., a parent may specify those websites allowed, as well as those applications available, to a user that is detected by the information handling system to be between 8 and 12 years old. In another example, once a "Senior Citizen Corner" computing environment has been implemented, a selectable override capability may be provided for those senior citizen users who are more tech savvy and do not wish to be limited to the simplified "Senior Citizen Corner" environment designed for less tech savvy senior citizen users. In one exemplary embodiment, the restricted computing environment may be integrated as part (e.g., tile) of the "Dell Stage" software tile interface available from Dell Inc. of Round Rock, Tex.

In one respect, disclosed herein is an automated method for operating an information handling system, including: providing an information handling system including at least one processing device, the processing device configured to provide interactive access for a user to an unrestricted computing environment that includes a set of available applications, content items, and setting options; capturing image data of facial characteristics of a current user of the information handling system; providing the captured image data to the processing device; analyzing the captured image data with the processing device to determine at least one of an age, gender, or age and gender of the current user from the facial characteristics of the current user; using the processing device to match a predefined user category with the determined age, gender, or age and gender of the current user; and using the processing device to limit the interactive functionality of the information handling system by providing interactive access for the current user to a restricted computing environment associated with the matched user category.

In another respect, disclosed herein is an information handling system, including: at least one processing device, the processing device configured to provide interactive access for a user to an unrestricted computing environment that includes a set of available applications, content items, and setting options, the processing device being further configured for coupling to at least image-capturing device to receive from the image-capturing device captured image data of facial characteristics of a current user of the information handling system. The processing device may be further configured: to analyze the captured image data to determine at least one of an age, gender, or age and gender of the current user from the facial characteristics of the current user, match a predefined user category with the determined age, gender, or age and gender of the current user, and limit the interactive functionality of the information handling system by providing interactive access for the current user to a restricted computing environment associated with the matched user category.

DESCRIPTION OF ILLUSTRATIVE EMBODIMENTS

Figure 1:
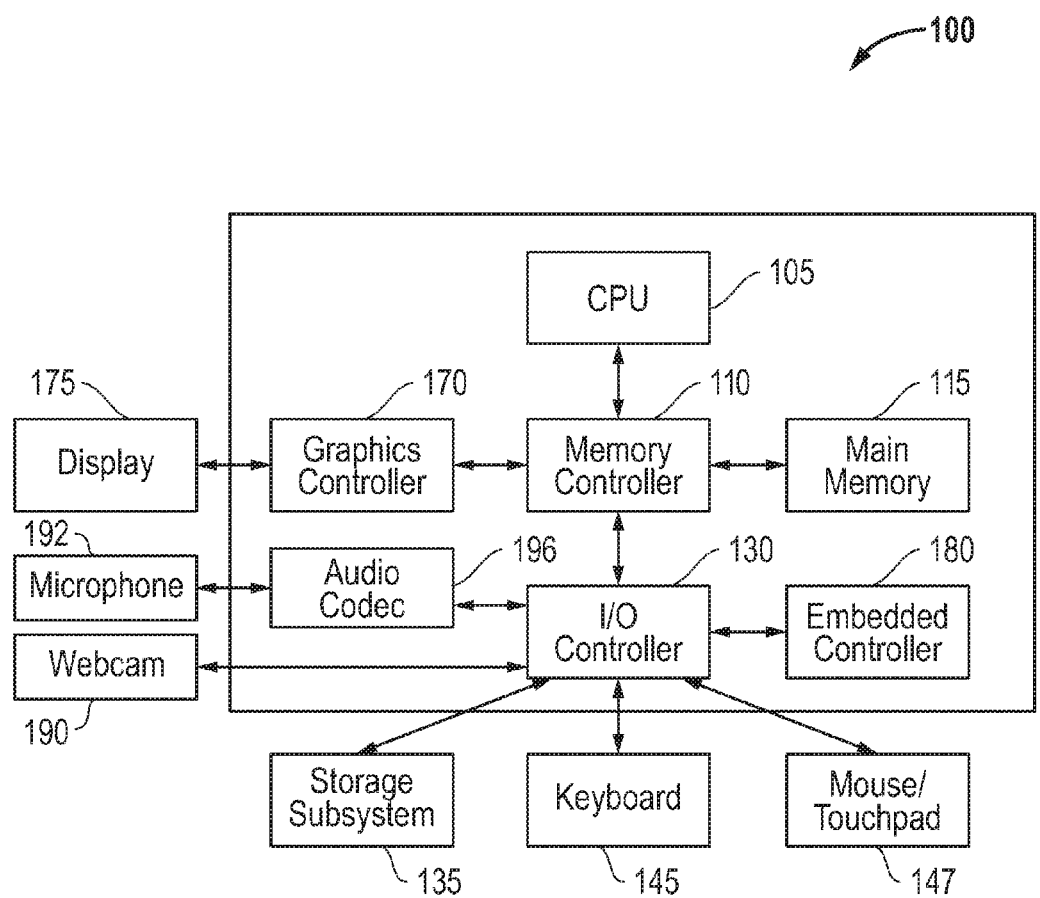
FIG. 1 is a block diagram of an information handling system according to one exemplary embodiment of the disclosed systems and methods.

FIG. 1 illustrates a block diagram of an information handling system 100 as it may be configured according to one embodiment of the disclosed systems and methods. As shown in FIG. 1, information handling system 100 of this exemplary embodiment includes a CPU 105 such as an Intel Pentium series processor, an Advanced Micro Devices (AMD) processor or one of many other processors currently available. A memory controller 110 is coupled to processor 105 to facilitate memory functions. System memory 115 (e.g., RAM) and a graphics controller 170 may be coupled to memory controller 110. A display 175 (e.g., LCD display or other suitable display device) is coupled to graphics controller 170 to provide visual images to the user. An I/O controller 130 is coupled to memory controller 110 to facilitate input/output functions for the information handling system. Local system storage 135 (e.g., one or media drives such as hard disk drive/s, optical drives, etc.) may be coupled to I/O controller 130 to provide permanent system storage for the information handling system. Input devices such as a keyboard 145 and touchpad 147 may be coupled to I/O controller 130 to enable the user to interact with the information handling system. An embedded controller (EC) 180 may be optionally provided for running system firmware (e.g., BIOS) and coupled to I/O controller 130, although system firmware may be executed in any other suitable manner by another processor of the system 100.

As further shown, a microphone 192 may be coupled to I/O controller 130 via audio codec circuit 196. A webcam 190 may be coupled to I/O controller 130 (e.g., via USB port and USB hub in I/O controller 130) to enable capture of images video. Webcam 190 may be disposed in any suitable position for capturing the facial image of a user of information handling system 100, e.g., webcam 190 may be positioned adjacent display 175 such that facial image data of a current user of information handling system is captured when the user is in a position for viewing display 175.

It will be understood that the particular configuration of FIG. 1 is exemplary only, and that an information handling system may be configured with fewer, additional or alternative components than those illustrated in FIG. 1. Further, the disclosed systems and methods may be employed with any other configuration of information handling system having one or more processing devices and at least one image capturing device that is suitable for implementing one or more of the tasks and/or features described elsewhere herein, e.g., including desktop computers, notebook computers, tablet computers, etc.

Figure 2:
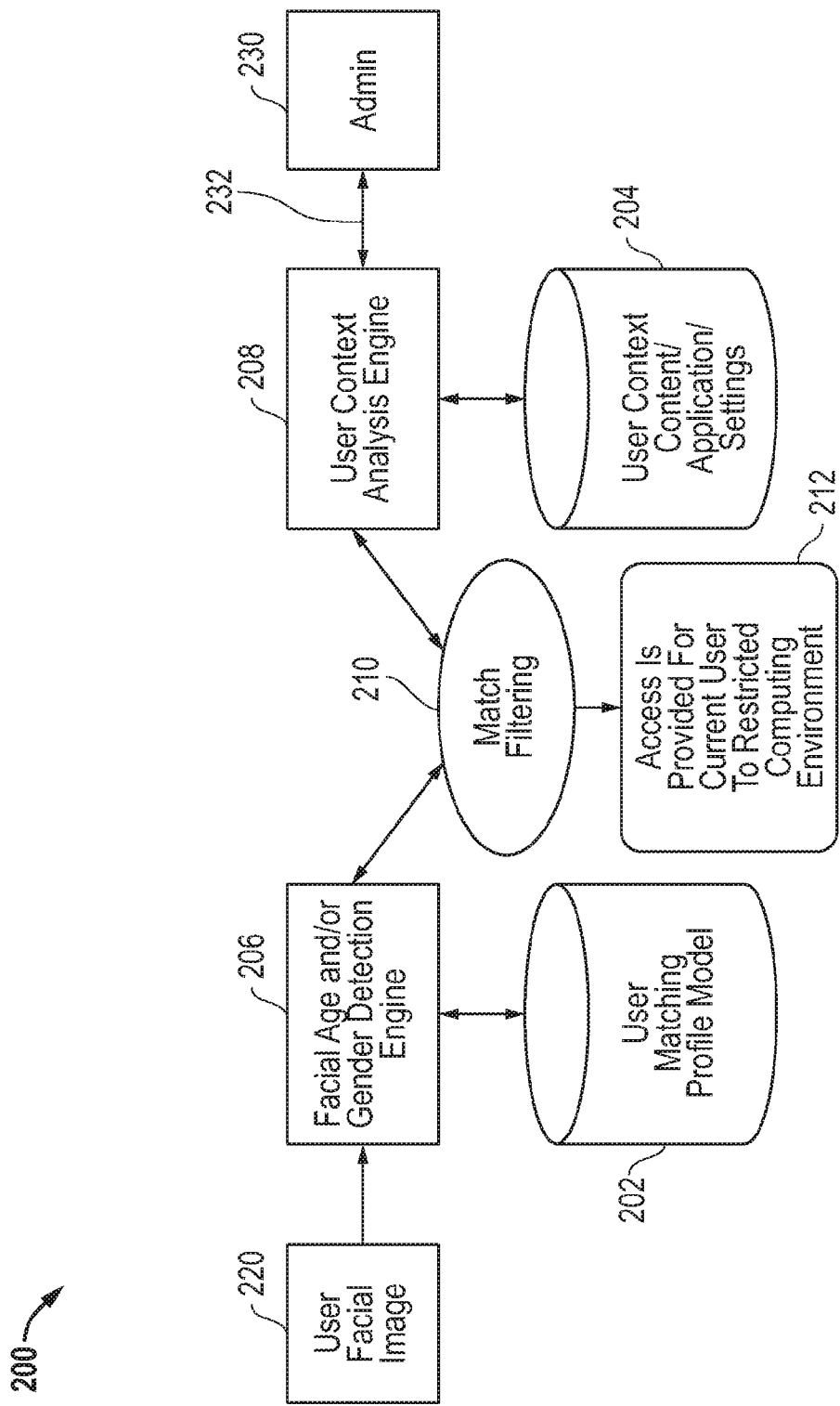
FIG. 2 illustrates a functional diagram of the interrelated components of a system architecture that may be implemented on an information handling system according to one exemplary embodiment of the disclosed systems and methods.

FIG. 2 illustrates a functional diagram of the interrelated components of a system architecture 200 that may be implemented on an information handling system (e.g., such as information handling system 100 of FIG. 1) to automatically launch a restricted computing environment based on detected facial age or gender category of a current user of the information handling system. As shown in FIG. 2, architecture 200 includes a facial age and/or gender detection engine 206 (e.g., executing on CPU 105 of information handling system 100) that is configured to receive captured user facial image data 220 (e.g., captured by webcam 190 of information handing system 100). A user matching profile 202 is provided (e.g., stored on storage subsystem 135) as shown, and includes age and/or gender facial attribute information employed to enable facial recognition of age and/or gender of a user as further described herein.

In the embodiment of FIG. 2, facial age and/or gender detection engine 206 may be configured to perform facial recognition of the age and/or gender of a current user of information handling system 100 using any suitable methodology, e.g., by using an algorithm to extract and analyze relative size and/or position of features from an image of the current user's face that contains one or more facial characteristics of the current user from which facial features may be extracted. For example, the relative position, size, and/or shape of features such as the current user's eyes, mouth, nose, cheekbones, skin and jaw may be extracted from the user facial image data 220. Other features such as skin coloring, perceived skin texture (e.g., smoothness versus wrinkles) and/or relative head or facial dimensions (e.g., detected ratio of length to width of a user's face or head, size of user's head or face) may also be extracted from the user facial image data 220. These extracted features may then be compared to facial attribute (or biometric) information residing in user matching profile model 202. In one embodiment, facial age and/or gender detection engine 206 may be configured to perform facial recognition of the age and/or gender of a current user of information handling system 100 using general facial attribute information that is not specific to any given individual (i.e., facial attributes that are not specific to any given individuals).

For example, age recognition may be performed based at least in part based on one or more detected features such as skin texture (e.g., greater amount of detected skin wrinkling indicates older current user whereas greater amount of skin smoothness indicates a younger user), size of face (e.g., relatively smaller face indicating younger current user), shape of mouth, facial skin coloring, relative positioning of facial features (e.g., nose, ears, eyes, etc.). A current user's age may be also be detected based at least in part on the relative dimensions of the user's face, e.g., ratio of length to width of the current user's face, with more rounded facial characteristics corresponding to younger users and more elongated or sagging facial features corresponding to older users. Detection of additional current user features such as presence of sagging or dark areas underneath the eyes may also be employed to detect older users. Similarly, gender recognition may be performed based on similar detected features, e.g., smaller facial size, presence of longer hair, and skin texture that indicates the presence of make up all together imply that the current user is a female. It will be understood that any suitable methodology for detecting age or gender may be implemented, and that such methodologies may be based on (or trained) in one exemplary embodiment by analyzing a large number of human faces of different ages and genders to determine particular detected features and/or combinations of detected features that indicate particular ages or gender.

In one exemplary embodiment, facial feature thresholds may be set for detecting facial age and/or gender, e.g., current users with greater than a given upper threshold amount of detected skin wrinkling or face elongation may be characterized as meeting a "senior citizen" user category while those current users with less than a given lower threshold amount of detected skin wrinkling or face elongation may be characterized as meeting a "kids" or "child" users category, and all current users with detected features falling in between the thresholds being characterized as meeting a "middle aged adult" users category. In another exemplary embodiment, facial features such as detected eyebrow thickness, detected hair length, detected hair shape and/or detected hair volume, etc. may be employed for characterizing a current user as a male or female. For example, current users with detected eyebrow thickness that is less than a given threshold eyebrow thickness may (optionally in combination with a detected hair length and detected hair volume that are greater than respective given hair length and/or hair volume thresholds) may be characterized as meeting a female user category, while all other users are characterized as male users.

As further shown in FIG. 2, a user context content/application/settings repository 204 is provided (e.g., stored on storage subsystem 135) as shown, and includes all applications (e.g., such as children learning programs, standard non-age specific email application, simplified senior citizen email application, children's Internet browser application, standard non-age specific Internet browser applications, simplified senior citizen browser application, children's game applications, standard non-age specific computer game applications, etc.), relevant content items (e.g., such as image files, video files, data files, etc.), and application settings (e.g., such as displayed font size, displayed icon size, identity and/or categories of Internet websites that are accessible by a browser, brightness of display, contrast of display, etc.) for different categories of users. Context content/application/settings repository 204 may also include information (e.g., look up table, flags or other suitable identifiers) that identifies or categorizes the components (content, applications and/or setting options) for the computing environment designated for each given category of user.

For example, context content/application/settings repository 204 may identify components of a restricted computing environment for the category of child users to only include those applications that are appropriate for children of a specific age such as 12 years or younger, e.g., children's learning programs, children's game applications and children's Intent browser applications that provide restricted access to only certain websites suitable for children 12 years old or younger. Additionally, context content/application/settings repository 204 may optionally and additionally identify components of a restricted computing environment for a gender category of a user, e.g., male or female specific applications such as boy or girl specific video games, male or female specific image or video media such as boy or girl specific movies, etc User context/application/settings repository 204 may identify components of a restricted computing environment for the category of senior citizens to only include those applications that are appropriate for the category of adult users of a specific age such as 65 years or older, e.g., simplified senior citizen browser, simplified senior citizen email program, large font setting designated for all applications, etc. Context/application/settings repository 204 may identify components of a non-restricted computing environment for the category of all users detected as being between the ages of 12 and 65 to include all applications, content items and normal default settings, e.g., for fonts, etc. It will be understood that the examples of particular ages and age ranges described herein are exemplary only and that the particular age and/or age ranges may vary as needed or desired to fit a given implementation. It will also be understood that additional user age categories (e.g., such as older children user category for detected user ages 8 to 12, teenage user category for detected user ages 13 to 18, etc.) may be further specified and associated with respective groups of designated applications, content items and setting options as desired.

Still referring FIG. 2, a user context analysis engine 208 may be provided for managing user context/application/settings repository 204. In this regard, user context analysis engine 208 may retrieve applications, content items and settings from repository 204 and provide this retrieved information to match filtering component 210, the operation of which will be described further herein. As shown, user context analysis engine 208 may also be provided with an optional administrative interface 232 for communicating with an administrator entity 230. Administrator entity 230 may be, for example, a local administrator user who after providing an appropriate password or completing another suitable form of verification operation is given access to modify the contents of user context/application/settings repository 204 and/or to modify operation of user context analysis engine 208. Administrator entity 230 may alternatively be a remote administrator user or system that accesses administrative interface 232 of user context analysis engine 208 for similar tasks across a network, such as the Internet or an intranet. Examples of administrative tasks that may be performed by an administrator entity 230 through administrative interface 232 include, but are not limited to, creating and modifying user categories (e.g., creating a new child or senior citizen user category and/or specifying or modifying age threshold of a user category), and adding or deleting applications, content items and/or setting options to the restricted computing environment for a given user category, etc.). Administrative interface 232 may also provide one manner with which to override the current selection of restricted computing environment, e.g., such as by a senior citizen user who does not wish to be limited to the restricted computing environment selected for a senior citizen user category.

Match filtering component 210 of FIG. 2 may be configured to receive from facial age and/or gender detection engine 206 information that is representative of the age and/or gender of a current user of information handling system 100 detected by facial age and/or gender detection engine 206 based on a captured video image provided from webcam 190. In this exemplary embodiment, match filtering component 210 also receives from user context analysis engine 208 the relevant applications, content items, and settings groups designated for different categories of identified users, e.g., identified by age thresholds and/or gender. Match filtering component 210 is configured to determine the user category of the current user of the information handling system based on the determined age and/or gender information from facial age and/or gender detection engine 206 and to select the applications, content items, and settings received from user context analysis engine 208 that are designated for the current user category. As shown match filtering component 210 is configured to provide interactive access 212 (i.e., interactive display and input access) for the current user to the applications, content items, and setting options designated for the restricted computing environment to the current user. It will be understood that the embodiment of FIG. 2 is exemplary only, and that any other configuration of fewer, additional or alternative components may be implemented on an information handling system to automatically launch a restricted computing environment based on detected facial age or gender category of a current user of the information handling system as described herein.

Figure 3:
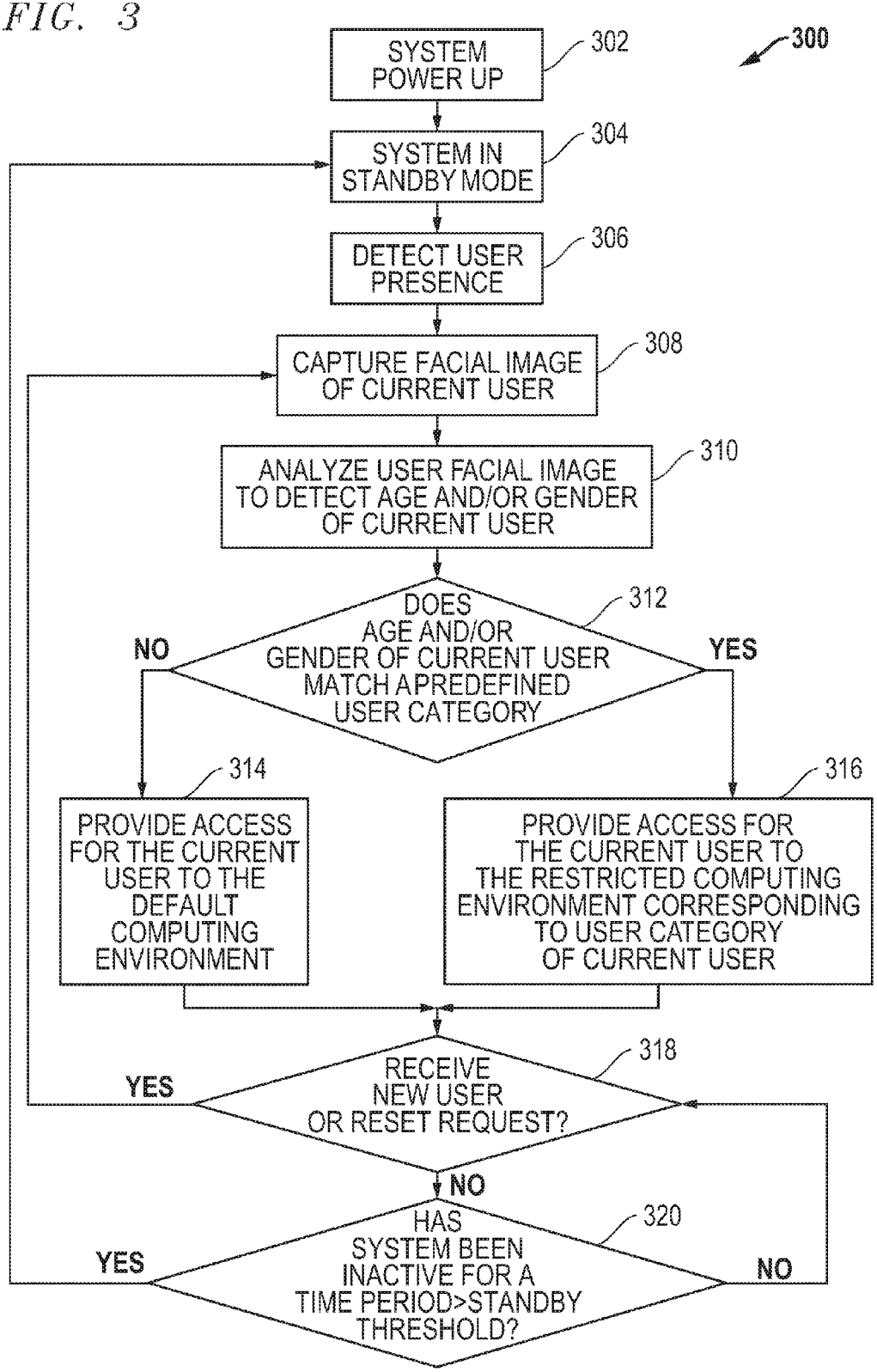
FIG. 3 illustrates one exemplary embodiment of methodology that may be implemented to launch a restricted computing environment according to one exemplary embodiment of the disclosed systems and methods.

FIG. 3 illustrates one exemplary embodiment of an automated methodology 300 that may be implemented to launch a restricted computing environment based on facial age and/or gender detection. Methodology 300 starts in step 302 where the system (e.g., such as information handling system 100) is powered up. The system enters a standby mode state in step 304, where it awaits the presence of a user. In the standby mode, limited or no access may be provided to applications, content items and setting options on the system. Rather, a wallpaper screen, login message, or other limited computing environment (e.g., providing access for a user to only generic application or information such as current weather conditions or time and date). As soon as a user is detected in step 306 (e.g., by detection of a key press on keyboard 145, movement of mouse/touchpad 147, detection of motion by webcam or separate motion detector, etc.), methodology 300 proceeds to step 308, where a facial image of the current user is captured (e.g., by webcam 190). This captured facial image is then analyzed to detect age and/or gender of the current user in step 310.

Still referring to FIG. 3, if the age and/or gender of the current user is determined in step 312 to match a particular predefined user category (e.g., young children user 8 years old or younger, senior citizen user aged 65 years old or greater, etc.), then methodology 300 proceeds to step 316 where interactive access to a restricted computing environment (i.e., having limited interactive access to applications, content items and/or setting options) corresponding to the user category of the current user is provided to the current user, e.g., via display 175 and I/O devices 145, 147. Access to only this restricted computing environment is continued until a new user or reset request is received from a current user in step 318 (e.g., via keystroke), or until the system becomes inactive in step 320 for a predefined standby threshold period of time (e.g., 10 minutes, 20 minutes, etc.) during which no input is received from a current user. If a new user or reset request is received from a current user in step 318, then methodology 300 returns to step 308 where a facial image of the current user is captured. If the system becomes inactive for a period of time greater than the standby threshold time in step 320, then methodology 300 returns to standby mode of step 304.

As further shown in FIG. 3, interactive access to an optional default computing environment may be provided for a current user in step 314 in the event that the age and/or gender of the current user determined in step 312 does not match a particular predefined user category. Applications, content items and/or setting options for such a default computing environment may be defined as desired. For example, a default computing environment may be selected to be unrestricted in the absence of detection of a young child or senior citizen user, e.g., a computing environment that is suitable for a middle aged adult user, e.g. having an age of from about 20 years old to about 64 years old. Alternatively, a very restricted default computing environment may be selected in the absence of detection of an adult current user having a required minimum age. In yet another alternative embodiment, no default computing environment may be implemented in the event that the age and/or gender of the current user determined in step 312 does not match a particular predefined user category. In such an alternative embodiment, methodology 300 may return to step 308 without providing access for a user to any computing environment, and the process may repeat until the detected age and/or gender of a current user matches a particular predefined user category.

Figure 4:
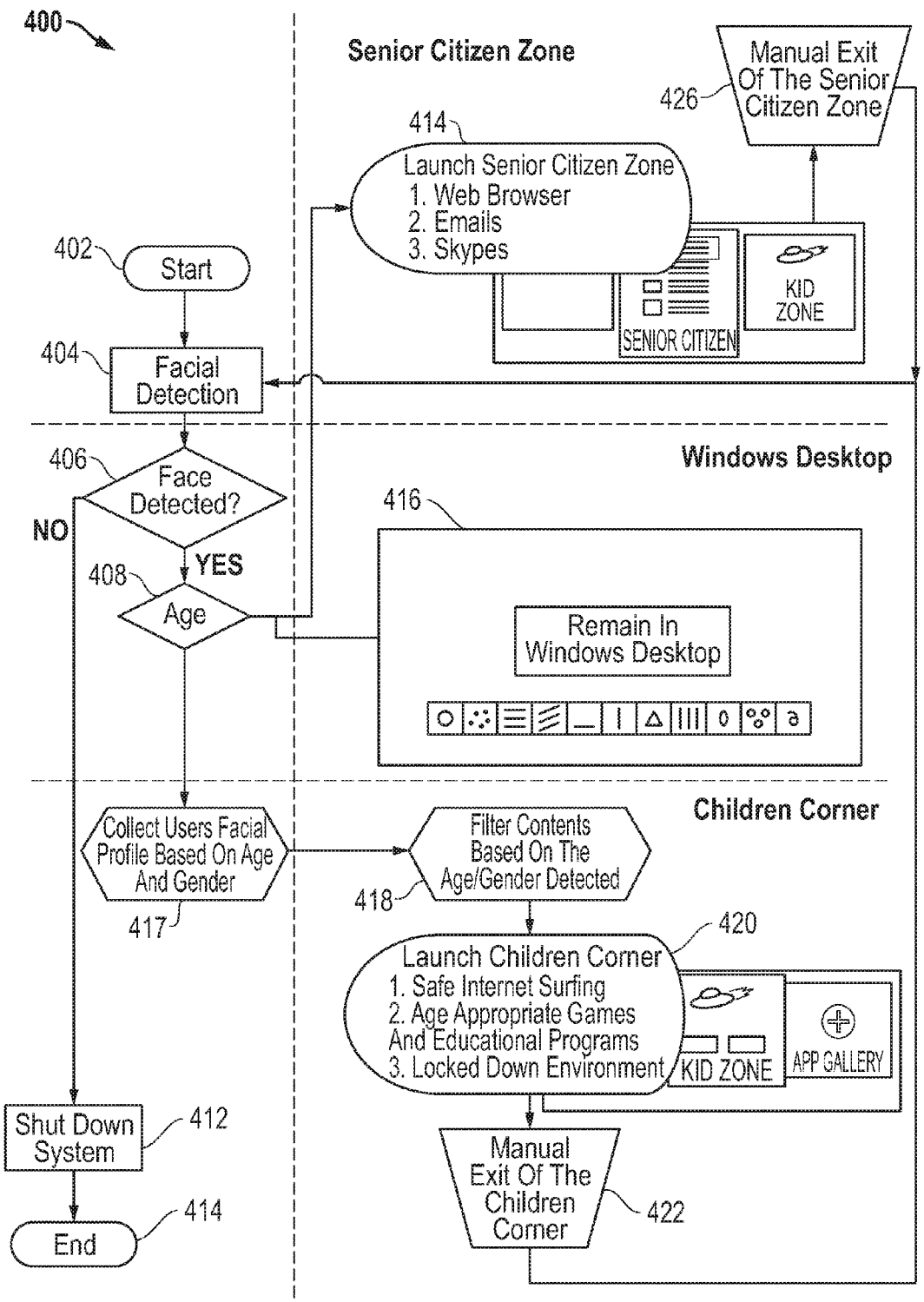
FIG. 4 illustrates one exemplary embodiment of methodology that may be implemented to launch a restricted computing environment according to one exemplary embodiment of the disclosed systems and methods.

FIG. 4 illustrates another exemplary embodiment of a particular automated methodology 400 that may be implemented to launch a restricted computing environment based on facial age. This particular methodology 400 may be usefully employed, for example, to provide a family friendly desktop "all in one solution" for three user categories of family members often found in a typical family household: children 18 years old and younger, senior citizens 55 years old and older, and middle-aged adults between the ages of 18 and 55.

As shown in FIG. 4, methodology 400 starts in step 402 where the system (e.g., such as information handling system 100) is powered up. In this embodiment, the system initially enters an unrestricted computing environment in step 402 (e.g., providing a user with interactive access to a normal windows desktop), but immediately uses an image-capturing device to detect the presence of a user face in step 404. The image-capturing device, such as webcam 190, may be positioned to monitor a typical users position immediately in front of the display 175. If no current user face is immediately detected in step 406, then the system shuts down in step 412 and methodology 400 ends with step 414. However, if a face of a current user is detected in step 406, then the captured facial image data of the current user is then analyzed in step 408 to determine the age of the current user. It will be understood that in another embodiment, the information handling system may initially enter a restricted computing environment corresponding to a child user category in step 402, and remain locked down in this restricted environment until a current user face is detected that is older than 18 years old, or the system is shut down.

If in step 408 the current user is determined to be between 18 years old and 55 years old (i.e., middle-aged adult user category), then the system remains in the unrestricted computing environment, in this case providing the middle aged adult user with interactive access to a normal windows desktop 416. If the current user is determined to 55 years old or greater in step 408, then methodology 400 proceeds to step 414 and launches a restricted computing environment corresponding to a senior citizen user category (e.g., as a displayed "Senior Citizen Zone" tile of the "Dell Stage" software tile interface) that provides simplified access for the current user to three applications: web browser application (such as Microsoft Internet Explorer or Mozilla Firefox), email application (such as Microsoft Outlook or Outlook Express, or Mozilla Thunderbird) and a communication application (e.g., such as Skype). Exit from the senior citizen user category may be provided either by manual (e.g., keyboard or mouse) command in step 426 to return to step 404, or alternatively by shutting down or rebooting the system to return to step 402.

However, if in step 408 the current user age is determined to be 18 years old or younger, then methodology 400 proceeds to step 417 where the current user profile (i.e., category) is collected based on the current user's age, and optionally also the current user's gender. In step 418 content items are filtered according to the determined child user category (e.g., age inappropriate content such as violent or sexually-oriented still images and violent or sexually-oriented video media are filtered out). Where gender of the current user is also optionally determined, then content items may also be filtered according to the determined gender (e.g., including only images and video media that is specific to the determined gender of the current user).

Methodology 400 then launches a restricted computing environment corresponding to a child user category (e.g., as a displayed "Children Corner" tile of the "Dell Stage" software tile interface) in step 420, e.g., providing restricted access for the current user only to a safe Internet surfing environment (with web page filtering or only approved websites being accessible), and age appropriate games and educational program applications. Only applications (e.g., video games, movies, etc.) that are specific to the determined gender of the current user may be included in the restricted computing environment where gender of the current user is optionally determined. As shown, the restricted computing environment corresponding to the child user category is then locked down for the current user session until a manual exit from the child user category restricted environment in step 422 (e.g., via a keystroke or mouse command) that returns methodology 400 to step 404. Alternatively, the system may be shut down or rebooted, in which case methodology 400 returns to step 402.

It will be understood that the methodology of FIGS. 3 and 4 is exemplary only, and that fewer, additional and/or alternative steps may be performed in any order suitable for implementing the automated selection and launching of a restricted computing environment based on detected facial age and/or gender of a current user.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

It will also be understood that one or more of the tasks, functions, or methodologies described herein (e.g., including for the implementation of methodology 300 on CPU 105 or other suitable processing device) may be implemented, for example, as firmware or other computer program of instructions embodied in a non-transitory tangible computer readable medium (e.g., such as storage subsystem 135 or other suitable medium) that is executed by a CPU, controller, microcontroller, processor, microprocessor, FPGA, ASIC, or other suitable processing device.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An automated method for operating an information handling system, comprising:
   providing an information handling system including at least one processing device, the processing device configured to provide interactive access for a user to a default unrestricted computing environment that includes all software applications, content items, and setting options that are available on the information handling system;
   capturing image data of facial characteristics of a current user of the information handling system;
   providing the captured image data to the processing device;
   analyzing the captured image data with the processing device to determine at least one of an age, gender, or age and gender of the current user from detected features of the facial characteristics of the current user;
   wherein one of the facial characteristic features detected is an amount of skin wrinkling and wherein a plurality of skin wrinkling thresholds are used for characterizing a user into a predefined age category;
   wherein eyebrow thickness, hair length, and hair volume thresholds are used to characterize a user into a predefined gender category; and
   wherein the method further comprises using the processing device to determine if the determined age, gender, or age and gender of the current user matches at least one predefined user category from a plurality of categories; and then performing the following steps without requiring entry or recognition of a password or username for the current user:
      if the determined age, gender, or age and gender of the current user matches one of the plurality of predefined user categories then using the processing device to limit the interactive functionality of the information handling system by providing interactive access for the current user to a restricted computing environment associated with the matched user category that does not include all software applications, content items, and/or setting options that are available on the information handling system; and
      if the determined age, gender, or age and gender of the current user matches no predefined user category then using the processing device to provide interactive access for the current user to the default unrestricted computing environment that includes all software applications, content items, and setting options that are available on the information handling system.

2. The method of claim 1, where the unrestricted computing environment includes a plurality of all available software applications, setting options and content items that are provided in the unrestricted computing environment to a user of the information handling system; and where the restricted computing environment associated with the matched user category defines at least one of a restricted subset of the available software applications, a restricted subset of the available content items, one or more designated application setting options that restricts the input or output functionality of at least one software applications application executed by the processing device, or a combination thereof.

3. The method of claim 2, further comprising:
   analyzing the captured image data with the processing device to determine an age of the current user from the facial characteristics of the current user;
   using the processing device to match a predefined user age category with the determined age of the current user; and
   using the processing device to provide interactive access for a current user to the restricted computing environment associated with the matched user age category.

4. The method of claim 3, where the predefined user age category is defined by all ages less than a predefined threshold age, and where the method further comprises:
   analyzing the captured image data with the processing device to determine an age of the current user from the facial characteristics of the current user that is less than the predefined threshold age;

using the processing device to match the predefined user age category with the determined age of the current user by determining from the facial characteristics of the current user that the age of the current user is less than the predefined threshold age; and using the processing device to provide interactive access for the current user to the restricted computing environment associated with the matched user age category defined by all ages less than a predefined threshold age.

5. The method of claim 3, where the predefined user age category is defined by all ages greater than a predefined threshold age, and where the method further comprises:

analyzing the captured image data with the processing device to determine an age of the current user from the facial characteristics of the current user that is greater than the predefined threshold age;

using the processing device to match the predefined user age category with the determined age of the current user by determining from the facial characteristics of the current user that the age of the current user is greater than the predefined threshold age; and using the processing device to provide interactive access for the current user to the restricted computing environment associated with the matched user age category defined by all ages greater than a predefined threshold age.

6. The method of claim 1, further comprising:

analyzing the captured image data with the processing device to determine a gender of the current user from the facial characteristics of the current user; and using the processing device to match a predefined user gender category with the determined gender of the current user, the predefined user category being defined based on user gender;

using the processing device to provide interactive access for the user to the restricted computing environment associated with the matched user gender category.

7. The method of claim 1, further comprising:

using the processing device to match a first predefined user category with the determined age, gender, or age and gender of a first current user by selecting a first predefined user category that matches the determined age, gender, or age and gender of the first current user from among multiple possible predefined user categories;

using the processing device to provide interactive access for the first current user to a first restricted computing environment associated with the matched first user category;

using the processing device to match a second predefined user category with the determined age, gender, or age and gender of a second current user by selecting a second predefined user category that matches the determined age, gender, or age and gender of the second current user from among multiple possible predefined user categories; and using the processing device to provide interactive access for the second current user to a restricted computing environment associated with the matched second user category;

where the first and second users are different users, the determined age, gender, or age and gender of the first current user being different than the determined age, gender, or age and gender of the second current user;

where the selected second predefined user category is different than the selected first predefined user category; and where the second restricted computing environment is different than the first restricted computing environment, the first restricted computing environment including a different restricted combined subset of available software applications, content items, and designated application settings that is different than the restricted combined subset of available software applications, content items, and designated application settings included in the second restricted computing environment.

8. The method of claim 1, where the unrestricted computing environment includes a plurality of all available software applications provided for interactive access for a user of the information handling system by the processing device, the available software applications comprising all Internet browsers, computer games, word processing programs, spreadsheet programs, and email applications that are present on the information handling system; and where the restricted computing environment associated with the matched user category defines a restricted subset of the available software applications provided for interactive access for a user of the information handling system by the processing device that does not include all Internet browsers, computer games, word processing programs, spreadsheet programs, and/or email applications that are present on the information handling system.

9. The method of claim 1, further comprising using the processing device to provide unrestricted interactive access for a user of the information handling system to a first set of Internet websites in the unrestricted computing environment; and using the processing device to provide restricted interactive access for a current user of the information handling system to a limited subset of the first set of Internet websites in the restricted computing environment associated with the matched user category.

10. The method of claim 1, where the information handling system is a notebook computer or a desktop personal computer.

11. The method of claim 1, where the restricted computing environment associated with the matched user category defines a restricted subset of software applications that does not include all Internet browser applications, computer game applications, word processing program applications, spreadsheet program applications, and/or email program applications that are available on the information handling system.

12. The method of claim 1, where the restricted computing environment associated with the matched user category defines a restricted subset of the available content that does not include all image file content items, video file content items, and/or data file content items that are available on the information handling system.

13. The method of claim 1, where the restricted computing environment associated with the matched user category defines a restricted subset of the available software application setting options that does not include all software application setting options that are available on the information handling system.

14. The method of claim 1, further comprising performing the following steps:

if the determined age, gender, or age and gender of the current user matches the predefined user category then using the processing device to provide interactive access for the current user to a tile display from which not all software applications, content items, and/or setting options that are available on the information handling system are accessible; and if the determined age, gender, or age and gender of the current user matches no predefined user category then using the processing device to provide interactive access for the current user to a normal windows desktop display from which all software applications, content items, and/or setting options available on the information handling system are accessible.

15. The method of claim 1, further comprising:
using the processing device to initially enter the default unrestricted computing environment upon system power up and prior to capturing and analyzing the image data; and
then using the processing device to shut down the information handling system if no current user face is immediately detected during the step of capturing image data.

16. The method of claim 1, further comprising:
using the processing device to initially enter the restricted computing environment upon system power up and prior to capturing and analyzing the image data; and
then using the processing device to only provide interactive access for the current user to the unrestricted computing environment if the determined age, gender, or age and gender of the current user does not match the predefined user category.

17. The method of claim 1, further comprising:
using the processing device to initially enter the restricted computing environment upon system power up and prior to capturing and analyzing the image data; and
then using the processing device to exit the restricted computing environment and enter the unrestricted computing environment in response to a manual command received from the current user.

18. An information handling system, comprising:
at least one processing device, the processing device configured to provide interactive access for a user to a default unrestricted computing environment that includes a set of available software applications, content items, and setting options, the processing device being further configured for coupling to at least one image-capturing device to receive from the image-capturing device captured image data of facial characteristics of a current user of the information handling system;
where the processing device is further configured to:
analyze the captured image data to determine at least one of an age, gender, or age and gender of the current user from detected features of the facial characteristics of the current user,
wherein one of the facial characteristic features detected is an amount of skin wrinkling and wherein a plurality of skin wrinkling thresholds are used for characterizing a user into a predefined age category,
wherein eyebrow thickness, hair length, and hair volume thresholds are used to characterize a user into a predefined gender category; and
where the processing device is further configured to:
match at least one predefined user category from a plurality of categories with the determined age, gender, or age and gender of the current user without requiring entry or recognition of a password or username for the current user, and
if the determined age, gender, or age and gender of the current user matches one of the plurality of predefined user categories then limit the interactive functionality of the information handling system by providing interactive access for the current user to a restricted computing environment associated with the matched user category that does not include all software applications, content items, and/or setting options that are available on the information handling system, and
if the determined age, gender, or age and gender of the current user matches no predefined user category then provide interactive access for the current user to the default unrestricted computing environment that includes all software applications, content items, and setting options that are available on the information handling system.

19. The system of claim 18, where the unrestricted computing environment includes a plurality of all available software applications, setting options and content items that are provided in the unrestricted computing environment to a user of the information handling system; and where the restricted computing environment associated with the matched user category defines at least one of a restricted subset of the available software applications, a restricted subset of the available content items, one or more designated application setting options that restricts the input or output functionality of at least one software application executed by the processing device, or a combination thereof.

20. The system of claim 19, where the processing device is further configured to:
analyze the captured image data to determine an age of the current user from the facial characteristics of the current user;
match a predefined user age category with the determined age of the current user; and
provide interactive access for a current user to the restricted computing environment associated with the matched user age category.

21. The system of claim 18, where the processing device is further configured to:
analyze the captured image data with the processing device to determine a gender of the current user from the facial characteristics of the current user; and
match a predefined user gender category with the determined gender of the current user, the predefined user category being defined based on user gender;
provide interactive access for the user to the restricted computing environment associated with the matched user gender category.

22. The system of claim 18, where the processing device is further configured to match a predefined user age category with the determined age of the current user by determining if the age of the current user is greater than or less than a predefined user age threshold.

23. The system of claim 18, where the processing device is further configured to:
match a first predefined user category with the determined age, gender, or age and gender of a first current user by selecting a first predefined user category that matches the determined age, gender, or age and gender of the first current user from among multiple possible predefined user categories;
provide interactive access for the first current user to a first restricted computing environment associated with the matched first user category;
match a second predefined user category with the determined age, gender, or age and gender of a second current user by selecting a second predefined user category that matches the determined age, gender, or age and gender of the second current user from among multiple possible predefined user categories; and
provide interactive access for the second current user to a restricted computing environment associated with the matched second user category;
where the first and second users are different users, the determined age, gender, or age and gender of the second current user being different than the determined age, gender, or age and gender of the first current user;

where the selected second predefined user category is different than the selected first predefined user category; and where the second restricted computing environment is different than the first restricted computing environment, the first restricted computing environment including a different restricted combined subset of available software applications, content items, and designated application settings that is different than the restricted combined subset of available software applications, content items, and designated application settings included in the second restricted computing environment.

24. The system of claim 18, where the unrestricted computing environment includes a plurality of available software applications provided for interactive access for a user of the information handling system by the processing device, the available software applications comprising all Internet browsers, computer games, word processing programs, spreadsheet programs, and email applications that are present on the information handling system; and where the restricted computing environment associated with the matched user category defines a restricted subset of the available software applications provided for interactive access for a user of the information handling system by the processing device that does not include all Internet browsers, computer games, word processing programs, spreadsheet programs, and/or email applications that are present on the information handling system.

25. The system of claim 18, where the processing device is further configured to:

provide unrestricted interactive access for a user of the information handling system to a first set of Internet websites in the unrestricted computing environment; and provide restricted interactive access for a user of the information handling system to a limited subset of the first set of Internet websites in the restricted computing environment associated with the matched user category.

26. The system of claim 18, further comprising:

at least one image-capturing device coupled to the processing device, the image-capturing device being configured to capture and provide to the processing device the captured image data of facial characteristics of a current user of the information handling system;

a storage subsystem coupled to the processing device, the storage subsystem having a user context content/application/settings repository stored thereon that includes the software applications, content items, and setting options designated for different categories of users, the processing device being configured to implement a user content analysis engine to retrieve the software applications, content items, and setting options designated for different categories of users from the user context content/application/settings repository;

where the storage subsystem further includes a user matching profile stored thereon that includes age and/or gender facial attribute information, the processing device being configured to implement a facial age and/or gender detection engine to receive the captured user facial image data from the image-capturing device and to perform facial recognition of at least one of the age, gender, or combination of age and gender of the current user of the information handling system; and where the processing device is further configured to:

perform a match filtering operation to determine the user category of the current user of the information handling system based on the determined age, gender, or combination of age and gender of the current user from the facial age and/or gender detection engine, select the software applications, content items, and setting options from the user context analysis engine of the restricted computing environment that are designated for the determined current user category, and provide interactive access for the current user only to the software applications, content items, and setting options designated for the restricted computing environment to the current user.

27. The system of claim 26, where the user context content/application/settings repository further comprises a look up table or flag that at least one of identifies or categorizes the content, software applications and/or setting options for each of the restricted and unrestricted computing environments; and where the processing device is further configured to implement the user content analysis engine to use the look up table or flag to retrieve the software applications, content items, and/or setting options designated for different categories of users from the user context content/application/settings repository.

28. The system of claim 18, where the information handling system is a notebook computer or a desktop personal computer.

* * * * *